Patented Oct. 20, 1925.

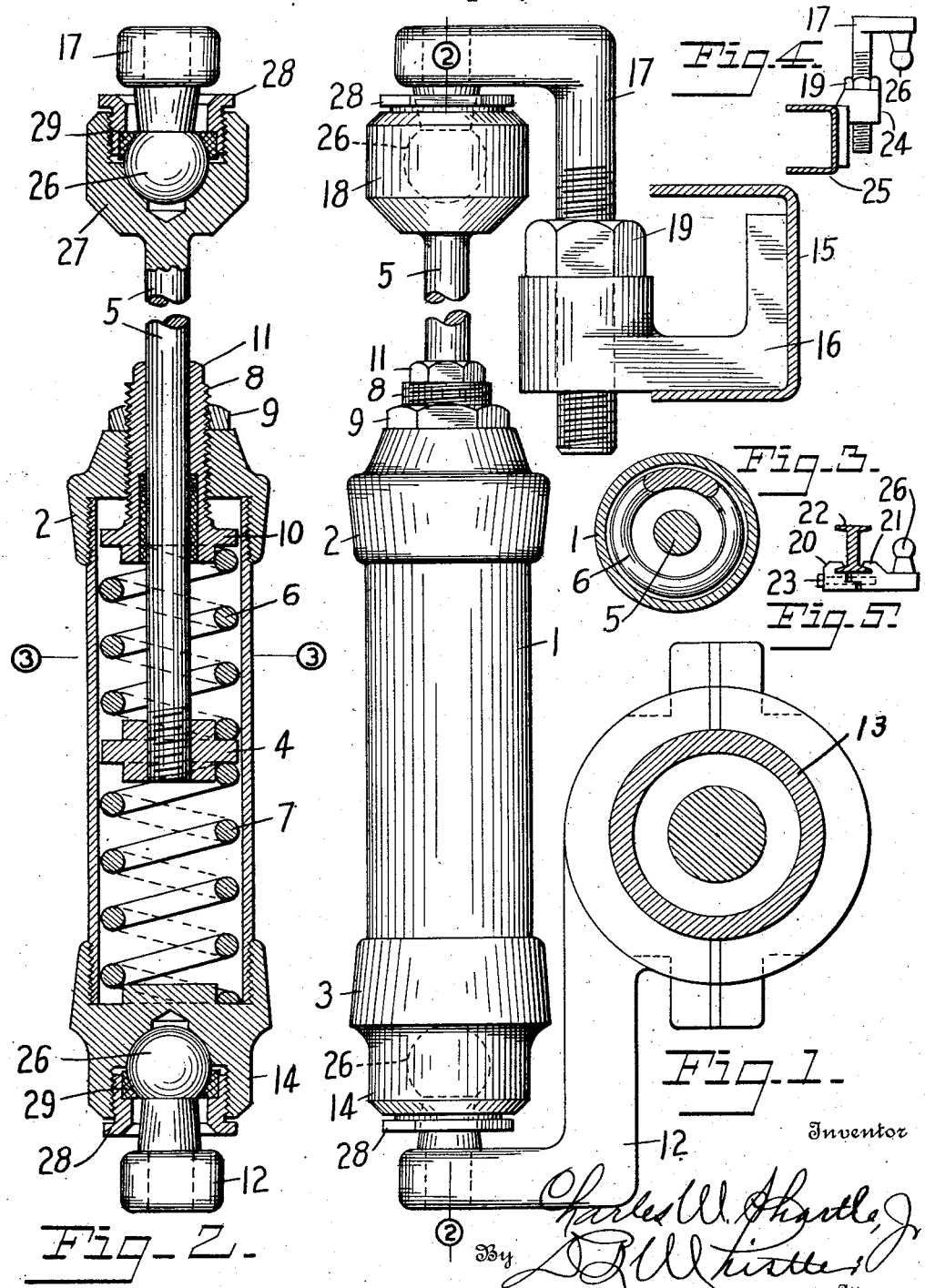

1,557,886

UNITED STATES PATENT OFFICE.

CHARLES W. SHARTLE, JR., OF MIDDLETOWN, OHIO.

SHOCK ABSORBER.

Application filed August 15, 1923. Serial No. 657,627.

*To all whom it may concern:*

Be it known that I, CHARLES W. SHARTLE, Jr., a citizen of the United States, residing in Middletown, in the county of Butler and State of Ohio, have invented certain new and useful Improvements in Shock Absorbers or the like, of which the following is a specification, reference being had therein to the accompanying drawings.

This invention relates to improvements in shock absorbers for motor vehicles.

The main object of the invention is to provide a shock absorber adapted to be interposed between the body or frame of the vehicle and an axle thereof in any suitable manner whereby both the direct and rebound shocks resulting in the operation of the vehicle will be transmitted through the device by direct action.

A further object of the invention is to provide an effective shock absorber of this character which will be simple in its mechanical organization, cheap to manufacture and easy to install, and which can readily be adjusted to regulate the resistance thereof.

While the improved shock absorber is adapted to be attached to a vehicle by any suitable mountings, the particular arrangement shown in the accompanying drawings in which a universal joint connection with the vehicle is made at both ends of the device, thus providing for free direct action of the shock absorber mechanism, is a preferred form for the average installation of the device.

In the drawings:

Fig. 1, is a side view of the shock absorber as applied at the rear of a motor vehicle;

Fig. 2, is a longitudinal sectional view taken on line 2—2 of Fig. 1;

Fig. 3, is a cross sectional view taken on line 3—3 of Fig. 1;

Figs. 4 and 5, are detail views of the upper and lower brackets respectively for mounting the device at the front of the vehicle.

The drawings illustrate a preferred arrangement of the installation of the shock absorbers for both the front and rear of the vehicle.

As here shown, the device consists of a cylindrical casing —1, having end caps —2, and —3, a piston —4, connected to a piston rod —5, operable in the cylinder between two opposing compression springs —6 and —7, which engage the piston on its opposite sides, the piston rod operating in an adjustable bearing sleeve —8 threaded into end cap —2 and secured in position relative thereto by means of a lock nut —9, the inner end of the sleeve having a head —10 which serves as a seat for the upper end of spring —6, the outer end of the sleeve being shaped as a nut —11 to receive a wrench whereby to adjust the sleeve to regulate the tension of springs —6 and —7. The device as shown in Figs. 1–2, rear installation, is attached at its lower end at the rear of the vehicle by means of a clamp bracket —12 secured to the axle housing —13 and having a universal joint connection —14 with lower end cap —3. The upper end of the device is connected to a frame member —13, by an adjustable bracket comprising a base member —16 in which is threaded a vertically adjustable bearing bracket —17, which in turn is connected to piston rod —5 by means of a universal joint —18, bracket —17 being held in position in its adjustable relation with base bracket —16 by a lock nut —19.

The brackets for mounting the shock absorber at the front of the vehicle are similar to the rear mounting brackets, the lower bracket consisting of opposite clamp members —20 —21, secured to the axle —22 by means of a clamp bolt —23, clamp member —21 having secured thereto one member of a universal joint, being the same construction as that shown in connection with lower rear bracket —12, for connecting the shock absorber. The upper front bracket consists of a base bracket —24, secured to a vehicle frame member —25, in which is supported one of the adjustable brackets —17, for making the connection with the upper end of the shock absorber.

The universal joints —14 and —18 are of the ball-and-socket type, each comprising a ball member —26 secured in the respective brackets —12 and —17, the socket member of the lower joint being formed in lower end cap —3, and of the upper joint by a socket member —27, secured to piston rod —5, each of the joints being adjustable by means of an adjusting nut —28, retaining washers —29, of suitable material as bronze or fiber, being used as inserts in adjusting nuts —28 to effect bearing relation with balls —26. As shown in Fig. 1, the shock absorbers are disposed in a direct line of action between the lateral extensions of brackets —12 and —17 of the rear installation and brackets —17 and —21 of the front installation, free direct action of piston —4 between the absorber springs 6 and 7 being maintained under all conditions of relative movements between the frame and axles of the vehicle by means of the universal joints —14 and —18, the direct wheel shocks being transmitted upwardly through the axle and lower absorber spring —7, and the rebound shocks through the frame of the vehicle and springs —6, the spring acting to absorb, or to reduce the force of the shock in either direction.

From the illustrations shown in the drawings and the description it will be seen that upon both direct and rebound shocks transmitted to the body of the vehicle the action of piston —4 against springs —6 and —7 will be direct, the direct action being against spring —6 and the rebound action against spring —7, the opposing spring actions thus serving to absorb or break the force of the vehicle shocks in both directions to an extent determined by the regulation of the tension of springs —6 and —7.

Having described my invention, I claim:

A shock absorber comprising mounting brackets spaced one from the other and secured respectively to the frame and axle of a motor vehicle, a shock absorber interposed between said brackets comprising a cylindrical housing and spring elements within the housing counteractive one of another, means for regulating the tension of the spring elements, connections between the shock absorber and said brackets comprising end caps for the shock absorber housing, a universal joint in the lower end cap whereby the same is operatively connected to the lower of said brackets, a piston operable in the other end cap and coactively between said spring elements, a universal joint connection between the piston and the other of said brackets including a member adapted to be adjusted rotatably and axially relative to said bracket to align the piston and shock absorber housing axially and regulate the distance between said connections, whereby the shock absorber as an operable unit will have free compensating action at both ends thereof between said relatively movable members.

In testimony whereof, I affix my signature.

CHARLES W. SHARTLE, Jr.